United States Patent [19]

Grimminger

[11] Patent Number: 5,143,673
[45] Date of Patent: Sep. 1, 1992

[54] PROCESS AND APPARATUS FOR UNDERWATER GRANULATION OF MOLTEN THERMOPLASTIC MATERIAL PARTICULARLY DURING START-UP PERIODS

[75] Inventor: Albert Grimminger, Leonberg, Fed. Rep. of Germany

[73] Assignee: Werner & Pfleiderer GmbH, Stuttgart, Fed. Rep. of Germany

[21] Appl. No.: 615,333

[22] Filed: Nov. 19, 1990

[30] Foreign Application Priority Data

Dec. 15, 1989 [DE] Fed. Rep. of Germany ....... 3941418

[51] Int. Cl.$^5$ .............................................. B29B 9/06
[52] U.S. Cl. .................................... 264/142; 264/143; 425/67; 425/308; 425/313; 425/404; 425/DIG. 230
[58] Field of Search ................ 264/39, 141, 142, 143, 264/169, 178 R, 237; 425/67, 86, 308, 309, 310, 311, 313, 404, 463, 464, DIG. 230

[56] References Cited

U.S. PATENT DOCUMENTS 4,759,889 7/1988 Voss ................................... 264/142
5,041,251 8/1991 McCoskey et al. ................ 264/142

Primary Examiner—Jay H. Woo
Assistant Examiner—James P. Mackey
Attorney, Agent, or Firm—Ladas & Parry

[57] ABSTRACT

In order to prevent solidification of melt in the openings in an orifice plate of an underwater granulator during start-up, the water discharged from the housing of the granulator is diverted to a low pressure outlet so that during start-up a ring of water is formed on the inner surface of the housing. Thereby, melt strands from the orifice plate are cut in air and after the throughout of the melt becomes sufficiently high, the water discharged from the granulator is no longer diverted but is supplied to a post-treatment station and the housing becomes filled with water due to higher back pressure whereupon underwater granulation takes place.

20 Claims, 2 Drawing Sheets

PROCESS AND APPARATUS FOR UNDERWATER GRANULATION OF MOLTEN THERMOPLASTIC MATERIAL PARTICULARLY DURING START-UP PERIODS

FIELD OF THE INVENTION

The invention relates to a process for the underwater granulation of molten thermoplastic material, particularly during start-up periods of operation.

The invention further relates to apparatus which carries out this process.

BACKGROUND

Underwater granulation or pelletizing has proven to be particularly effective for the granulation of thermoplastic materials and is utilized worldwide for the industrial manufacture of plastic granulate (e.g. DE-OS 26 46 309 and its equivalent U.S. Pat. No. 4,150,595). Here, the hot plastic melt coming from an extruder directly enters a water bath in a granulator housing through the outlets or nozzles of an orifice plate. The strands of plastic from the outlets are cut, by a cutting device adjacent to the orifice plate, into granules which are washed away with cooling water above the housing and are dried in a post-treatment station. The start-up of such devices often presents difficulties, since during start-up, i.e., upon introduction of the cooling water into the granulator housing to fill the same, the melt outlets in the orifice plate can become partially or completely clogged due to solidification of the melt therein, particularly since in this stage the melt throughput is still very low and thus lacks the heating power of the full flowing hot melt.

In order to alleviate this deficiency, it is known from DE-OS 19 37 862 to arrange a start-up valve between the extruder and the orifice plate in order to divert the product from the extruder into the atmosphere for a period of time according to the individual circumstances. The use of such a start-up valve in fact provides improvement in the start-up process as regards supply of sufficiently heated plastic melt to the orifice plate, but the solidification in individual melt outlets cannot be completely eliminated due to the input of water into the granulator housing.

Water ring granulation is disclosed in DE-PS 14 54 888 and its equivalent U.S. Pat. No. 3,343,213 as an alternative to underwater granulation and therein the cutting device is surrounded by a granulate collecting and cooling housing and the granulate is spun from the cutting device to the water ring, which is formed on the inside wall of the housing. Water ring granulation cannot be employed for all types of thermoplastic materials, particularly those which tend to adhere to the orifice plate and to the knives of the cutting device.

SUMMARY OF THE INVENTION

An object of the invention is to achieve underwater granulation for thermoplastic materials in which clogging of the melt outlets during start-up due to solidification of the melt in the outlets of the orifice plate is avoided.

In order to satisfy the above and further objects, the invention provides a process for the granulation of a molten thermoplastic material in a liquid medium, such as water, in which a molten thermoplastic material is passed through the openings of an orifice plate to produce strands of the thermoplastic material, the strands are discharged into a liquid cooling medium flowing through a granulator housing, the strands of thermoplastic material being cut in the liquid medium to form granulates of thermoplastic material in the liquid medium, and then the granulates and liquid medium are discharged from the housing to a post-treatment station. During start-up, the liquid cooling medium flowing through the granulator housing is formed as an annular ring surrounding said orifice plate so that initially the strands of melt from the outlet openings are discharged into air and are cut into granules which then drop into the ring of liquid cooling medium. The granules are discharged from the housing in the liquid medium flowing through the housing and the flow of the granules and the liquid medium is diverted before the granules and liquid medium reach the post-treatment station, at a relatively low back pressure until the throughput of the molten thermoplastic material in the openings of the orifice plate reaches a predetermined value. Thereupon, the diversion of the flow of granules and liquid medium is terminated and the granules and liquid medium are conveyed to said post-treatment station which increases the back-pressure of the liquid in the housing causing the housing to become filled with said liquid medium whereupon further granulation takes place in the liquid medium.

A clogging of the outlets in the orifice plate due to solidification of the melt during start-up of the underwater granulating device is prevented by the process according to the invention, since the filling of the granulator housing and thus the transition to underwater granulation begins only after the theoretical throughput for the melt is reached.

According to a feature of the invention, the transition from start-up to continuous operation is obtained by the increased back-pressure of the flow of granulate and coating liquid in the post-treatment station by arranging the inlet at the post-treatment station at a level above the outlet of the granulator housing. A rapid filling of the housing then takes place.

The invention also contemplates apparatus for the granulation of molten thermoplastic material in a liquid medium such as water, i.e. underwater granulation, comprising a granulator housing having an inlet and an outlet for flow of a liquid cooling medium through said housing, an orifice plate operatively disposed relative to said housing and having openings through which molten thermoplastic material is passed and discharged as strands into said housing, cutting means in said housing adjacent to said orifice plate for cutting the strands of molten thermoplastic material discharged from the openings in said orifice plate into granulate, post-treatment means for said granulate, means for conveying said granulate and the cooling medium flowing from said outlet of said housing to an inlet of said post-treatment means, and diverting means connected to the conveying means between the outlet of the housing and the inlet of the post-treatment means for selectively diverting flow of liquid and granulate from said post-treatment means, said inlet of said post-treatment means being at a level above the outlet of the housing and above the diverting means.

BRIEF DESCRIPTION OF THE FIGURES OF THE DRAWING

The invention will be described with reference to an embodiment illustrated in the drawing, wherein.

DETAILED DESCRIPTION

Figure 1:
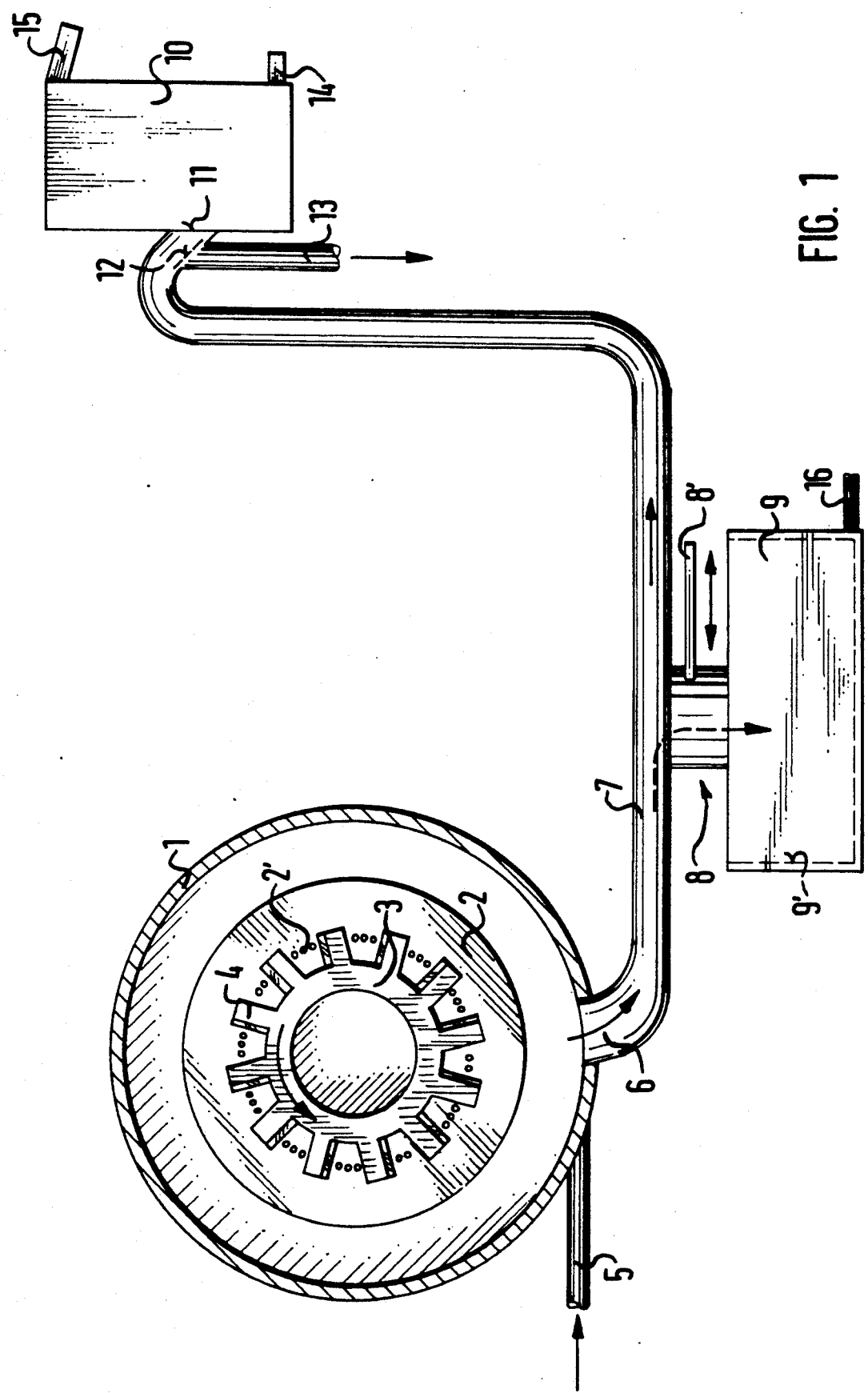
FIG. 1 diagrammatically illustrates a granulator housing and cutting device in cross section with a schematically illustrated post-treatment stage.

Plastic melt is prepared in an extruder 18 which is not shown in great detail. An orifice plate 2 provided with outlet openings 2' is secured to extruder 18, for example, by a threaded connection. A cutting device 3 equipped with a plurality of cutting blades 4 and driven in rotation by a shaft 17 is mounted adjacent to orifice plate 2. The cutting device 3 is surrounded annularly by a granulator housing 1. An inlet 5 for a cooling liquid such as water is disposed at the lower region of housing 1. An outlet 6 for water and granulate is connected to the bottom of housing 1. The outlet 6 is connected to line 7 for conveyance to a post-treatment stage including, for example, a dryer 10. A start-up diverting means 8 can be opened or closed by a gate valve 8'. A start-up tank 9 provided with a filter insert 9' is connected to diverting means 8. The dryer 10 is mounted at a higher level so that the dryer inlet 11 connected to line 7 corresponds at least to the highest possible water level in housing 1. A filter 12 provided with an outflow pipe 13 is arranged in front of the dryer inlet 11 and is used for preliminary dewatering in line 7. Dryer 10 is provided with a discharge outlet 14 for water and with an outlet 15 for dry granulate.

Figure 2:
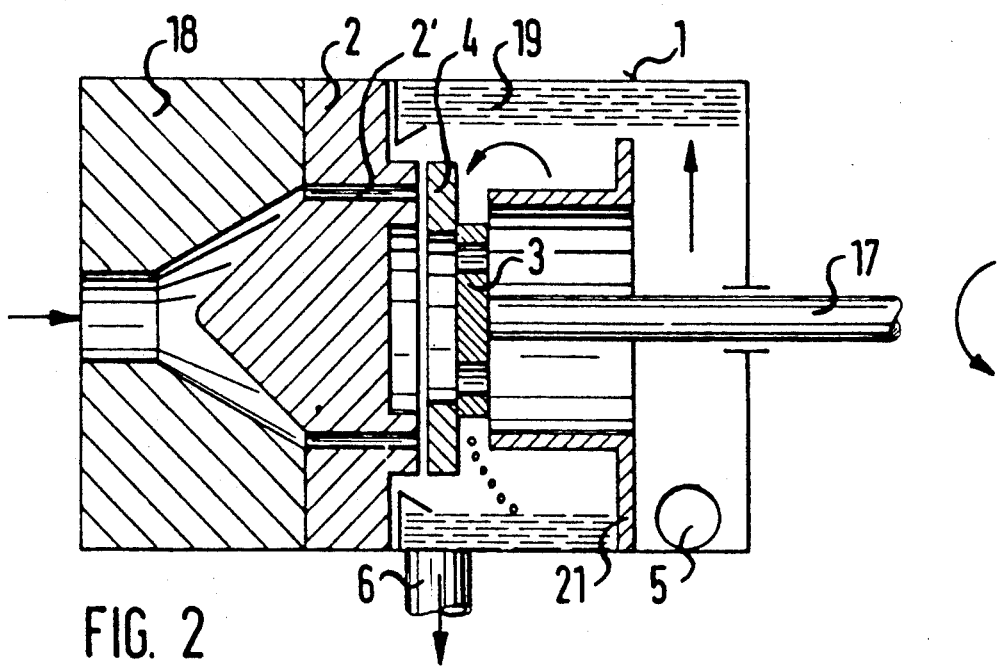
FIG. 2 shows the underwater granulation device connected to the melt outlet of an extruder, in longitudinal section, with a water ring in the start-up phase.
Figure 3:
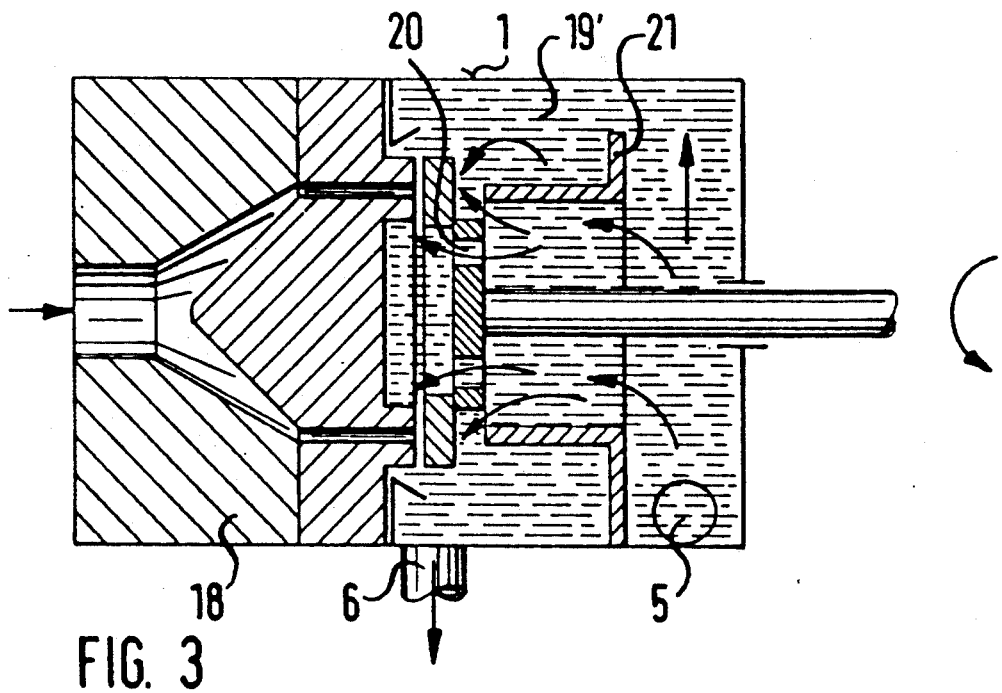
FIG. 3 shows the apparatus in FIG. 2 after the granulator housing has been filled and is in a continuous operation state.

During start-up an annular ring of water 19 is formed on the inside wall of housing 1 as shown in FIG. 2. FIG. 3 shows the state of continuous operation (underwater granulation) with a filled housing 1. The water level is here designated 19'. A plurality of holes 20 are provided in a wall of cutting device 3 for the purpose of water flow for an improved cooling of cutting blade 4 with granulate-free cooling water. The cooling water introduced into holes 20 flows from a sleeve 21 surrounding cutting device 3, the sleeve being of cylindrical form in the axial direction.

The process steps during start-up are described hereafter with reference to the operation of the apparatus.

During start-up of the underwater granulating apparatus, valve 8' of diverter means 8 is opened, such that initially the flow of water and granulate is diverted into start-up tank 9. Since the latter lies below the level of the water-granulate discharge outlet 6 and itself is provided with a lower water discharge outlet 16, substantially no back-pressure is developed and the underwater granulation apparatus operates from the very beginning as a water-ring granulating unit, i.e., initially the cooling water flowing in at high pressure through cooling water inlet 5 on the inside wall of housing 1 forms the water ring 19. Thus, orifice plate 2 and cutting device 3 are not cooled by this water ring 19. When the theoretical throughput of the melt is obtained in all outlet openings 2', valve 8' is closed, so that housing 1 becomes filled with water due to the back-pressure that now is developed at the inlet of dryer 10. After filling has been completed, the introduction of cooling water is adapted to the requirements of the underwater granulation operation.

The solidification of plastic material in outlet openings 2' is avoided by means of the invention in a simple way by operation of granulator housing 1 in the start-up phase as a water ring granulator and switching over to underwater granulation only after a sufficient throughput of melt is obtained. At this time the start-up valve 8' is closed. The elevation of the dryer is not absolutely necessary for obtaining back-pressure; this can also be achieved by a correspondingly higher placement of a loop in line 7. The filling of the granulator housing 1 may be considerably accelerated by providing an additional cooling water inlet into housing 1 (not shown). The inlet 5 and outlet 6 of housing 1 are axially spaced from one another as seen in FIGS. 2 and 3 to achieve the water flow through the housing 1 so that incoming water will carry away the granulate as a granulate-water mixture to the outlet 6. The inlet 5 extends tangentially into housing 1 to facilitate the formation of the water-ring 19 during start-up and the granulate-water mixture flows from outlet 6 into line 7 in a direction also tangential to the housing. During start-up the water ring 19 surrounds the orifice plate 1 so that the melt strands are cut in air by the cutting device 3 and the resulting granules will drop into the water-ring for discharge at outlet 6.

Although the invention has been described with reference to a preferred embodiment, numerous modifications and variations will become obvious to those skilled in the art within the scope and spirit of the invention as defined in the attached claims.

What is claimed is:

1. A process for the granulation of a molten thermoplastic material in a liquid medium, comprising:

passing a molten thermoplastic material through openings in an orifice plate to produce strands of the thermoplastic material, discharging the strands into a liquid cooling medium flowing through a granulator housing, cutting the strands of thermoplastic material in the liquid medium to form granulates of thermoplastic material in the liquid medium, discharging the granulates and liquid medium from the housing to a post-treatment station, and during start-up of the process, forming the liquid cooling medium flowing through the granulator housing as an annular ring which surrounds said orifice plate so that initially the strands of melt from said openings in the orifice plate are discharged into air and are cut into granules which then drop into the ring of liquid cooling medium, discharging the granules from the housing in the liquid medium flowing through the housing, diverting the flow of the granules and the liquid medium discharged from the housing, before the granules and liquid medium reach the post-treatment station, at a relatively low back-pressure until the throughput of the molten thermoplastic material in the openings of the orifice plate reaches a predetermined value, and then terminating said diverting of the flow of granules and liquid medium and conveying the granules and liquid medium to said post-treatment station which increases the back-pressure of the liquid medium in the housing causing the housing to become filled with said liquid medium.

2. A process as claimed in claim 1, wherein the diverted flow of the granules and liquid medium is supplied to a tank and the diverting of said flow is effected by controlling a valve between the tank and a discharge line from the housing.

3. A process as claimed in claim 2, comprising arranging an inlet for said tank at a level below an outlet of the housing for liquid medium and granulate.

4. A process as claimed in claim 1, said post-treatment station producing increased back pressure in the housing by arranging an inlet for granulate and liquid medium at the post-treatment station at a level above an outlet of the housing for liquid medium and granulate.

5. A process as claimed in claim 1, comprising supplying liquid medium into the granulator housing tangentially.

6. A process as claimed in claim 5, comprising discharging the liquid medium and granulate from said housing into a discharge line which extends tangentially of said housing.

7. A process as claimed in claim 1, comprising introducing a second flow of liquid cooling medium into said housing to fill the housing.

8. Apparatus for the granulation of a molten thermoplastic material in a liquid medium comprising
a granulator housing having an inlet and an outlet for flow of a liquid cooling medium through said housing,
an orifice plate operatively disposed relative to said housing and having openings through which molten thermoplastic material is passed and discharged as strands into the liquid cooling medium flowing through said housing,
cutting means in said housing adjacent to said orifice plate for cutting the strands of molten thermoplastic material discharged from the openings in said orifice plate into granulate,
post-treatment means for post-treating said granulate,
means for conveying said granulate and the cooling liquid medium flowing from said outlet of said housing to an inlet of said post-treatment means, and
diverting means connected to the conveying means between the outlet of the housing and the inlet of the post-treatment means for selectively diverting flow of liquid medium and granulate from said post-treatment means,
said inlet of said post-treatment means being at a level above the outlet of the housing and above the diverting means.

9. Apparatus as claimed in claim 8, wherein said conveying means has an outlet controlled by said diverting means which is larger than the inlet of said post-treatment means.

10. Apparatus as claimed in claim 8, wherein said housing is annular and said inlet and outlet are arranged to provide tangential flow of liquid medium to and from said housing.

11. Apparatus as claimed in claim 8, wherein said inlet to said post-treatment means is at a level corresponding approximately to a highest liquid medium level in said housing.

12. Apparatus as claimed in claim 8, wherein said post-treatment means comprises a dryer.

13. Apparatus as claimed in claim 8, wherein said diverting means includes a valve approximately at the level of the outlet of said housing.

14. Apparatus as claimed in claim 13, comprising a tank below said valve for receiving flow of diverted liquid medium and granulate.

15. Apparatus as claimed in claim 8, comprising a tank at relatively low pressure connected by said diverting means to said conveying means when said diverting means diverts the liquid medium and granulate from the post-treatment means so as to produce a back pressure at said outlet of the housing which is less than the back pressure produced at said outlet when said post-treatment means is connected to said outlet.

16. Apparatus for the granulation of a molten thermoplastic material in a liquid medium, comprising:
means for passing a molten thermoplastic material through openings in an orifice plate to produce strands of the thermoplastic material;
means for discharging the strands into a liquid cooling medium flowing through a granulator housing;
means for cutting the strands of thermoplastic material in the liquid medium to form granulates of thermoplastic material in the liquid medium;
conveying means for conveying the granulates and liquid medium from the housing to a post-treatment station;
means for forming the liquid cooling medium flowing through the granulator housing as an annular ring during start-up when the strands of thermoplastic material are first discharged into the granulator housing, said annular ring surrounding said orifice plate so that initially the strands of melt from said openings in said orifice plate are discharged into air and are cut into granules which then drop into the ring of liquid cooling medium;
means for discharging into the conveying means the granules from the housing in the liquid medium flowing through the housing;
means for diverting the flow of the granules and the liquid medium discharged from the housing, before the granules and liquid medium reach the post-treatment station, at a relatively low back pressure during said start-up until the throughput of the molten thermoplastic material in the openings in the orifice plate reaches a predetermined value; and
means for terminating said diverting of the flow of granules and liquid medium and conveying the granules and liquid medium to said post-treatment station which increases the back-pressure of the liquid medium in the housing causing the housing to become filled with said liquid medium.

17. Apparatus as claimed in claim 16, comprising a tank connected to said conveying means for receiving from said conveying means diverted flow of the granules and liquid medium, said means for diverting said flow comprising a valve between the tank and said conveying means.

18. Apparatus as claimed in claim 17, wherein said tank has an inlet for diverted flow of granules and liquid medium, said means for discharging granules in liquid medium from said housing comprising an outlet in said housing, said inlet of said tank being at a level below said outlet in the housing.

19. Apparatus as claimed in claim 16, wherein said means for discharging the granules in the liquid medium from the housing comprises an outlet in said housing, said apparatus further comprising an inlet for granules and liquid medium at the post-treatment station at a level above said outlet in the housing.

20. Apparatus as claimed in claim 16, wherein said conveying means comprises a discharge line extending tangentially of said housing for discharge of the liquid medium and granules from said housing.

* * * * *